US011232197B2

(12) United States Patent
Okamura et al.

(10) Patent No.: US 11,232,197 B2
(45) Date of Patent: Jan. 25, 2022

(54) COMPUTER SYSTEM AND DEVICE MANAGEMENT METHOD

(71) Applicant: Hitachi, Ltd., Tokyo (JP)

(72) Inventors: Naoya Okamura, Tokyo (JP); Takumi Tsujishita, Tokyo (JP); Masanori Fujii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 229 days.

(21) Appl. No.: 16/568,590

(22) Filed: Sep. 12, 2019

(65) Prior Publication Data
US 2020/0159918 A1 May 21, 2020

(30) Foreign Application Priority Data
Nov. 15, 2018 (JP) .............................. JP2018-214980

(51) Int. Cl.
*H04L 29/06* (2006.01)
*G06F 21/55* (2013.01)
*G06F 13/10* (2006.01)
*G06F 21/57* (2013.01)

(52) U.S. Cl.
CPC .......... *G06F 21/554* (2013.01); *G06F 13/102* (2013.01); *G06F 21/575* (2013.01); *G06F 2221/034* (2013.01)

(58) Field of Classification Search
CPC .... G06F 21/554; G06F 13/102; G06F 21/575; G06F 2221/034; G06F 21/85
See application file for complete search history.

(56) References Cited

U.S. PATENT DOCUMENTS

| | | | | |
|---|---|---|---|---|
| 5,022,070 A | * | 6/1991 | Forson | H04M 3/533 379/2 |
| 5,583,987 A | * | 12/1996 | Kobayashi | G06F 11/006 714/11 |
| 5,682,551 A | * | 10/1997 | Pawlowski | G06F 13/4027 710/22 |
| 6,333,932 B1 | * | 12/2001 | Kobayasi | H04L 5/16 370/253 |
| 2005/0223284 A1 | * | 10/2005 | Strickland | G06F 11/0727 714/23 |
| 2005/0265370 A1 | * | 12/2005 | Fuente | H04L 69/16 370/412 |
| 2012/0062158 A1 | * | 3/2012 | Itou | B60L 50/16 318/400.21 |
| 2014/0344630 A1 | * | 11/2014 | Sampei | G06F 11/076 714/48 |
| 2016/0077799 A1 | | 3/2016 | Matsui et al. | |
| 2017/0242760 A1 | * | 8/2017 | Tanaka | G06F 11/1608 |
| 2019/0266055 A1 | * | 8/2019 | Grau | H04L 43/0805 |
| 2020/0257273 A1 | * | 8/2020 | Kurokawa | H04L 12/28 |

FOREIGN PATENT DOCUMENTS

JP    2016-062166 A    4/2016

* cited by examiner

*Primary Examiner* — Taghi T Arani
*Assistant Examiner* — Lin Chang
(74) *Attorney, Agent, or Firm* — Mattingly & Malur, PC

(57) ABSTRACT

In a storage system including an FPGA having a logic which executes a prescribed processing and a plurality of devices coupled to the FPGA via a bus, the logic of the FPGA is configured to: attempt to access the plurality of devices and, based on a status of access to the devices, determine whether or not there is an abnormality in the access to the devices; and when it is determined that there is an abnormality in the access to a device, reset an IF unit for performing a communication processing via a bus of the device.

6 Claims, 9 Drawing Sheets

FIG. 3

| # | Device name | Access address | Access unit | Process | Access frequency | Deadlock concern | Topological depth | Higher-level device | Monitoring mode | Number of retries |
|---|---|---|---|---|---|---|---|---|---|---|
| 1 | Drive IF | 0x12340000 | 4 Bytes | Read/Write | 100 nanoseconds | Absent | 1 | Absent | ON | 3 |
| 2 | Device | 0x567800000 | 2 Bytes | Read/Write | 10 microseconds | Absent | 2 | #3 | ON | 3 |
| 3 | SW | 0xA0500000 | 128 Bytes | Write | 50 nanoseconds | Absent | 1 | Absent | OFF | 3 |
| 4 | Inter-controller relay 1 | 0xA0508000 | 4 Bytes | Read/Write | 50 nanoseconds | Present | 1 | Absent | ON | 3 |
| 5 | Inter-controller relay 2 | 0x90000000 | 64 Bytes | Write | 10 nanoseconds | Present | 1 | Absent | ON | 1 |
| 6 | Accelerator | 0x91000000 | 1 Byte | Read | 3 seconds | Absent | 2 | #3 | OFF | 1 |

COMPUTER SYSTEM AND DEVICE MANAGEMENT METHOD

CROSS-REFERENCE TO PRIOR APPLICATION

This application relates to and claims the benefit of priority from Japanese Patent Application No. 2018-214980 filed on Nov. 15, 2018, the entire disclosure of which is incorporated herein by reference.

TECHNICAL FIELD

The present invention relates to a technique for increasing resistance to failures in a computer system.

BACKGROUND

For example, a storage system as an example of a computer system having a storage device that stores data is equipped with a controller that controls input and output of data to and from the storage device. The controller includes a processor (for example, a CPU (Central Processing Unit)) for integrally controlling processing.

In a storage system, due to various factors, a hang-up (an abnormal shutdown; hereinafter, also simply referred to as a hang) of a CPU (a CPU core) mounted to a controller may occur.

For example, when an IF of a transmission path that couples LSIs mounted to the system to each other fails, the CPU may hang. The CPU may also hang when a device with a failure factor such as an errata (a design error) of LSI having an IF of the transmission path, a failure of a power supply, a clock, or an internal logic circuit is accessed. In addition, for example, in a redundant storage system that uses redundant controllers, a CPU may also hang due to a deadlock failure that occurs when each controller uses a shared hardware resource.

When a failure occurs in which a CPU of a controller of one of the systems of the redundant storage system hangs, there is a risk that the failure may propagate to a controller of another system and a situation where the entire redundant storage system shuts down or a situation that requires the controllers to be block may arise.

For example, as a technique for coping with a shutdown state of a processing apparatus, a technique for resetting a relay when a buffer-full state of a buffer of the relay is detected in a shutdown state of a processing apparatus is known (for example, refer to Japanese Patent Application Laid-open No. 2016-62166).

SUMMARY

Since storage systems may be used as, for example, a mission-critical apparatus, storage systems are required to have increased resistance to failure and, even when a failure that causes a processor to hang occurs, storage systems are required to solve the failure and execute normal processing as quickly as possible. Storage systems are also required to preempt and cope with a failure potential that may cause a processor to hang.

The present invention has been made in consideration of the circumstances described above, and an object thereof is to provide a technique that enables a failure or a failure potential in a computer system to be coped with in an appropriate manner.

In order to achieve the object described above, a computer system according to an aspect is a computer system including a processing unit having a hardware logic configured to execute prescribed processing and a plurality of devices coupled to the processing unit via a bus, wherein the hardware logic of the processing unit is configured to: attempt to access the plurality of devices and, based on a status of access to the devices, determine whether or not there is an abnormality in the access to the devices; and when it is determined that there is an abnormality in the access to the devices, reset a device-side interface unit configured to perform communication processing via a bus of the devices.

According to the present invention, a failure or a failure potential in a computer system can be coped with in an appropriate manner.

BRIEF DESCRIPTION OF THE DRAWINGS

FIG. 3 is a configuration diagram of an initial configuration table according to the embodiment;

DETAILED DESCRIPTION OF THE EMBODIMENT

An embodiment will be described with reference to the drawings. It should be noted that the embodiment described below is not intended to limit the invention as set forth in the accompanying claims and that all of the elements described in the embodiment and combinations thereof are not necessarily essential to solutions proposed by the invention.

Although information will be described below using expressions such as an "AAA table", information may be expressed using any kind of data structure. In other words, an "AAA table" can also be referred to as "AAA information" in order to indicate that information is not dependent on data structure.

Figure 1:
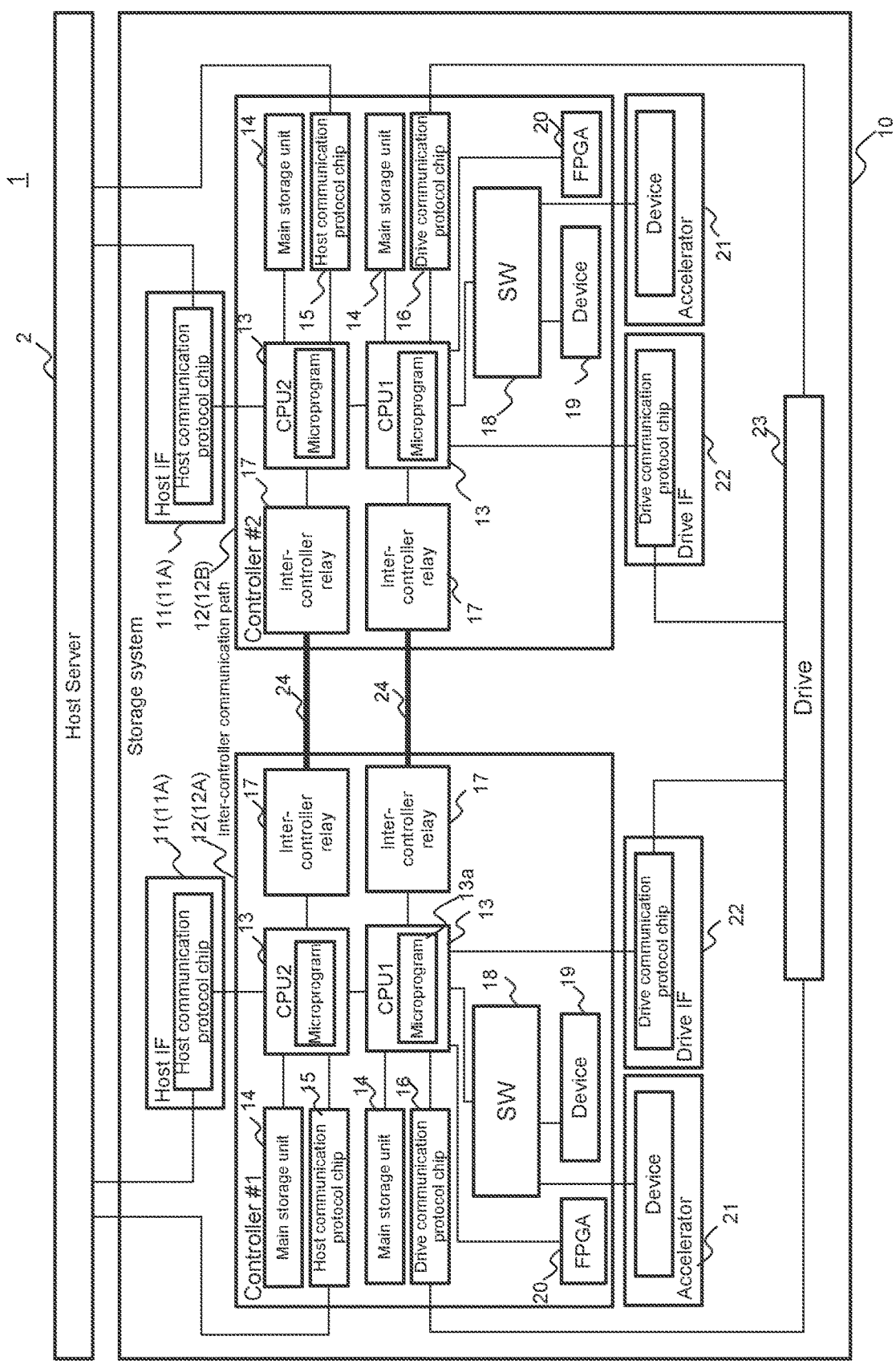
FIG. 1 is an overall configuration diagram of an information processing system according to an embodiment.

FIG. 1 is an overall configuration diagram of an information processing system according to an embodiment.

An information processing system 1 includes a host server 2 and a storage system 10 coupled to the host server 2 via a network. The network is a communication path such as a wired LAN (Local Area Network) or a wireless LAN.

The storage system 10 is an example of a computer system and includes a plurality of host IFs (interfaces) 11

(11A and 11B), a plurality of controllers 12 (12A and 12B), a plurality of drive IFs (interfaces) 22, a plurality of accelerators 21, and a drive 23.

The host IF 11 has a host communication protocol chip and mediates communication between the host server 2 and the controller 12. The accelerator 21 is device that is coupled to one of the controllers 12 in order to execute specific processing in the one controller 12. The drive 23 is, for example, one or more HDDs (hard disk drives) or SSDs (solid state drives) for storing user data to be used by the host server 2, programs to be executed by the controller 12, and data to be used by the controller 12. In the present embodiment, the controllers 12A and 12B are respectively capable of using the drive 23. The drive IF 22 has a drive communication protocol chip and mediates communication between the drive 23 and the controller 12.

The controller 12 includes a plurality of CPUs 13, a plurality of main storage units 14, a host communication protocol chip 15, a drive communication protocol chip 16, a plurality of inter-controller relays 17, a switch (SW) 18, a device 19, and an FPGA (Field Programmable Gate Array) 20 as an example of a processing unit.

The CPU 13 executes various processing by executing a program stored in the main storage unit 14 or an internally-stored microprogram 13a. The main storage unit 14 is, for example, a DRAM (Dynamic Random Access Memory) and stores a program to be executed by the CPU 13 and data to be used by the CPU 13. The main storage unit 14 is coupled to one CPU 13.

The host communication protocol chip 15 mediates communication between the host server 2 and the controller 12. The drive communication protocol chip 16 mediates communication between the drive 23 and the controller 12.

The inter-controller relay 17 is coupled to inter-controller relay 17 of the controller 12 of another system via inter-controller relay communication path 24 and mediates communication between the CPU 13 of the controller 12A and the CPU 13 of the controller 12B. Alternatively, switches may be provided in place of the inter-controller relay 17.

The SW 18 communicably couples the CPU 13 with various devices. In the present embodiment, the CPU 13, the device 19, and the accelerator 21 are coupled to the SW 18. The device 19 executes prescribed processing.

Figure 2:
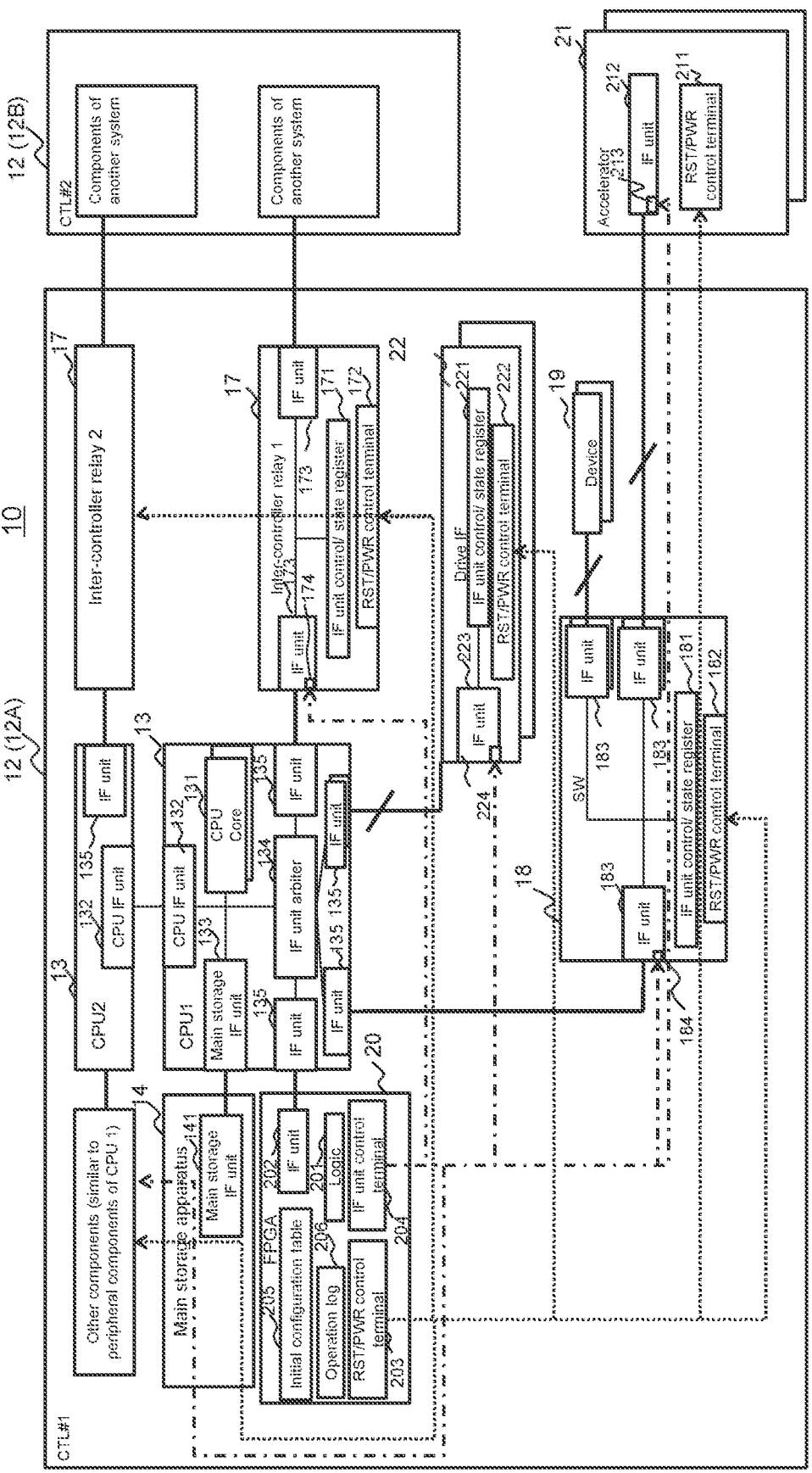
FIG. 2 is an overall configuration diagram of a storage system according to the embodiment.

The FPGA 20 performs access processing to a device that is a monitoring target being coupled via a bus (a transmission path) to detect an abnormality of the device, or an abnormality of a bus or a relay between the FPGA 20 and the device, and executes coping processing based on a detected abnormality. In the present embodiment, the FPGA 20 is coupled to the CPU 13 and is capable of accessing the device that is a monitoring target via the CPU 13. The FPGA 20 is capable of behaving as an entity equivalent to a CPU core 131 (FIG. 2). In other words, the FPGA 20 is capable of proactively accessing the device that is a monitoring target independent of control of the CPU core 131. Examples of the device that is a monitoring target include the inter-controller relay 17, the SW 18, the device 19, the accelerators 21, and the drive IF 22.

Next, the configuration of the storage system 10 will be described in greater detail.

FIG. 2 is an overall configuration diagram of the storage system according to the embodiment. It should be noted that the configuration of a part of the storage system has been omitted in FIG. 2.

The controller 12 includes the CPU 13, the main storage unit 14, the inter-controller relay 17, the SW 18, the device 19, the FPGA 20, and the drive IF 22.

The CPU 13 includes one or more CPU cores (an example of processor cores) 131, a CPU IF unit 132, a main storage IF unit 133, an IF unit arbiter 134, and a plurality of IF units 135. The CPU core 131 executes processing in accordance with a program stored in the main storage unit 14 or the microprogram 13a. The CPU IF unit 132 performs communication via a bus with the other CPU 13 inside the same controller 12. The main storage IF unit 133 performs communication via a bus with the main storage unit 14. The IF unit arbiter 134 controls communication among a plurality of coupled portions. The IF unit 135 performs communication with other devices. Although switch function units (the plurality of IF units 135, the IF unit arbiter 134, and the like) are provided inside the CPU 13 in the present embodiment, alternatively, the switch function units may be arranged outside the CPU.

The main storage unit 14 includes a main storage IF unit 141. The main storage IF unit 141 performs communication via a bus with the main storage IF unit 133 of the CPU 13. The main storage IF unit 141 is an example of the device-side interface unit.

The inter-controller relay 17 includes an IF unit control/state register 171, an RST/PWR control terminal 172, and an IF unit 173. The IF unit control/state register 171 stores information indicating a state of the IF unit 173. The RST/PWR control terminal 172 receives a device OFF signal for instructing power of the inter-controller relay 17 to be turned off and a device reset signal for instructing the inter-controller relay 17 to be reset. In the present embodiment, the RST/PWR control terminal 172 is coupled to the FPGA 20 via a signal line and a signal from the FPGA 20 can be input thereto. When the inter-controller relay 17 receives a device OFF signal by the RST/PWR control terminal 172, the inter-controller relay 17 turns its own power off, and when the inter-controller relay 17 receives a device reset signal by the RST/PWR control terminal 172, the inter-controller relay 17 resets itself.

The IF unit 173 performs communication via a bus with IF units of other devices. The IF unit 173 has an IF unit control terminal 174 that receives an IF reset signal for instructing the IF unit 173 to be reset. In the present embodiment, the IF unit control terminal 174 is coupled to the FPGA 20 via a signal line and a signal from the FPGA 20 can be input thereto. When an IF reset signal is received via the IF unit control terminal 174, the IF unit 173 resets itself. The IF unit 173 is an example of the device-side interface unit.

The SW 18 includes an IF unit control/state register 181, an RST/PWR control terminal 182, and a plurality of IF units 183. The RST/PWR control terminal 182 receives a device OFF signal for instructing power of the SW 18 to be turned off and a device reset signal for instructing the SW 18 to be reset. In the present embodiment, the RST/PWR control terminal 182 is coupled to the FPGA 20 via a signal line and a signal from the FPGA 20 can be input thereto. When the SW 18 receives a device OFF signal by the RST/PWR control terminal 182, the SW 18 turns its own power off, and when the SW 18 receives a device reset signal by the RST/PWR control terminal 182, the SW 18 resets itself.

The IF unit 183 performs communication via a bus with IF units of other devices. The IF unit 183 has an IF unit control terminal 184 that receives an IF reset signal for instructing the IF unit 183 to be reset. In the present embodiment, the IF section control terminal 184 is coupled to the FPGA 20 via a signal line and a signal from the FPGA 20 can be input thereto. When the IF unit 183 receives an IF reset signal via the IF section control terminal 184, the IF unit 183 reset itself. The IF unit 183 is an example of the device-side interface unit.

The drive IF 22 includes an IF unit control/state register 221, an RST/PWR control terminal 222, and an IF unit 223. The IF unit control/state register 221 stores information indicating a state of the IF unit 223. The RST/PWR control terminal 222 receives a device OFF signal for instructing power of the drive IF 22 to be turned off and a device reset signal for instructing the drive IF 22 to be reset. In the present embodiment, the RST/PWR control terminal 222 is coupled to the FPGA 20 via a signal line and a signal from the FPGA 20 can be input thereto. When the drive IF 22 receives a device OFF signal by the RST/PWR control terminal 222, the drive IF 22 turns its own power off, and when the drive IF 22 receives a device reset signal by the RST/PWR control terminal 222, the drive IF 22 resets itself.

The IF unit 223 performs communication via a bus with IF units of other devices. The IF unit 223 has an IF unit control terminal 224 that receives an IF reset signal for instructing the IF unit 223 to be reset. In the present embodiment, the IF unit control terminal 224 is coupled to the FPGA 20 via a signal line and a signal from the FPGA 20 can be input thereto. When the IF section 223 received an IF reset signal via the IF unit control terminal 224, the IF unit 223 resets itself. The IF unit 173 is an example of the device-side interface unit.

The FPGA 20 includes a logic 201, an IF unit 202, an RST/PWR control terminal 203, an IF unit control terminal 204, an initial configuration table 205, and an operation log 206.

The logic 201 is a hardware logic that executes various processing. In this case, the hardware logic of the logic 201 includes a combinational circuit or a sequential circuit and is capable of executing processing by non-software and non-Von Neumann type operations. In the present embodiment, the logic 201 executes failure detecting/coping processing with respect to a failure in devices or on a bus between the devices. Details of the processing by the logic 201 will be described later.

The IF unit 202 is coupled to the IF unit 135 of the CPU 13 via a bus and communicates with other devices via the CPU 13. The IF unit 202 is an example of the processing unit-side interface unit.

The RST/PWR control terminal 203 is coupled to an RST/PWR control terminal of a device via a signal line. Via the RST/PWR control terminal 203, the FPGA 20 transmits, to a device that is a monitoring target, a device OFF signal for instructing power of the device to be turned off and a device reset signal for instructing the device to be reset. The IF unit control terminal 204 is coupled to an IF unit control terminal of a device via a signal line. Via the IF unit control terminal 204, the FPGA 20 transmits, to the IF unit of the device, an IF reset signal for instructing the IF unit to be reset.

The initial configuration table 205 stores various types of information with respect to devices of the storage system 10. For example, the initial configuration table 205 is configured by the CPU 13 upon startup of the storage system 10. The operation log 206 includes information indicating a device in which a failure has been detected in failure detecting/coping processing.

The accelerator 21 includes an RST/PWR control terminal 211 and an IF unit 212. The RST/PWR control terminal 211 receives a device OFF signal for instructing power of the accelerator 21 to be turned off and a device reset signal for instructing the accelerator 21 to be reset. In the present embodiment, the RST/PWR control terminal 211 is coupled to the FPGA 20 via a signal line and a signal from the FPGA 20 can be input thereto. When the accelerator 21 receives a device OFF signal by the RST/PWR control terminal 211, the accelerator 21 turns its own power off, and when the accelerator 21 receives a device reset signal by the accelerator 21, the accelerator 21 resets itself.

The IF unit 212 performs communication via a bus with IF units of other devices. The IF unit 212 has an IF unit control terminal 213 that receives an IF reset signal for instructing the IF unit 212 to be reset. In the present embodiment, the IF unit control terminal 213 is coupled to the FPGA 20 via a signal line and a signal from the FPGA 20 can be input thereto. When the IF unit 212 receives an IF reset signal via the IF unit control terminal 213, the IF unit 212 resets itself. The IF unit 212 is an example of the device-side interface unit.

Next, the initial configuration table 205 will be described.

FIG. 3 is a configuration diagram of the initial configuration table according to the embodiment.

The initial configuration table 205 stores an entry for each device of the storage system 10. An entry of the initial configuration table 205 includes fields of a number (#) 205*a*, a device name 205*b*, an access address 205*c*, an access unit 205*d*, processing 205*e*, an access frequency 205*f*, a deadlock concern 205*g*, a topological depth 205*h*, a higher-level device 205*i*, a monitoring mode 205*j*, and the number of retries 205*k*.

The #205*a* stores the entry's number (a device's number). The device name 205*b* stores a name of the device (a device name) corresponding to the entry. The access address 205*c* stores an address for accessing the device corresponding to the entry. The access unit 205*d* stores a size of data (an access unit) when accessing the device corresponding to the entry. The processing 205*e* stores access processing performed when diagnosing the device corresponding to the entry. The access processing is any of a read, a write, and read and write (read/write). When a read is performed as the access processing, since read processing inside the device is performed, whether or not internal processing of the device is normal can be diagnosed as a result of the access. The access frequency 205*f* stores a frequency at which the device corresponding to the entry is accessed. The deadlock concern 205*g* stores information (deadlock concern information) indicating whether or not there is a possibility that the device corresponding to the entry may cause a deadlock among a plurality of controllers or, in other words, whether or not there is a concern. The topological depth 205*h* stores a depth of topology of the device corresponding to the entry. The topological depth may be, for example, a depth with the CPU core 131 as a reference. The higher-level device 205*i* stores a number of a device on a higher level (a reference side) of the device corresponding to the entry. The monitoring mode 205*j* stores information indicating whether or not the device corresponding to the entry is to be a monitoring target. Monitoring modes include ON indicating that the device corresponding to the entry is to be a monitoring target and OFF indicating that the device corresponding to the entry is not to be a monitoring target. The number of retries 205*k* stores the number of retries of access processing (a diagnostic routine) when diagnosing the device corresponding to the entry.

Next, an overview of diagnostic processing of a bus and a device in the storage system 10 will be described.

Figure 4:
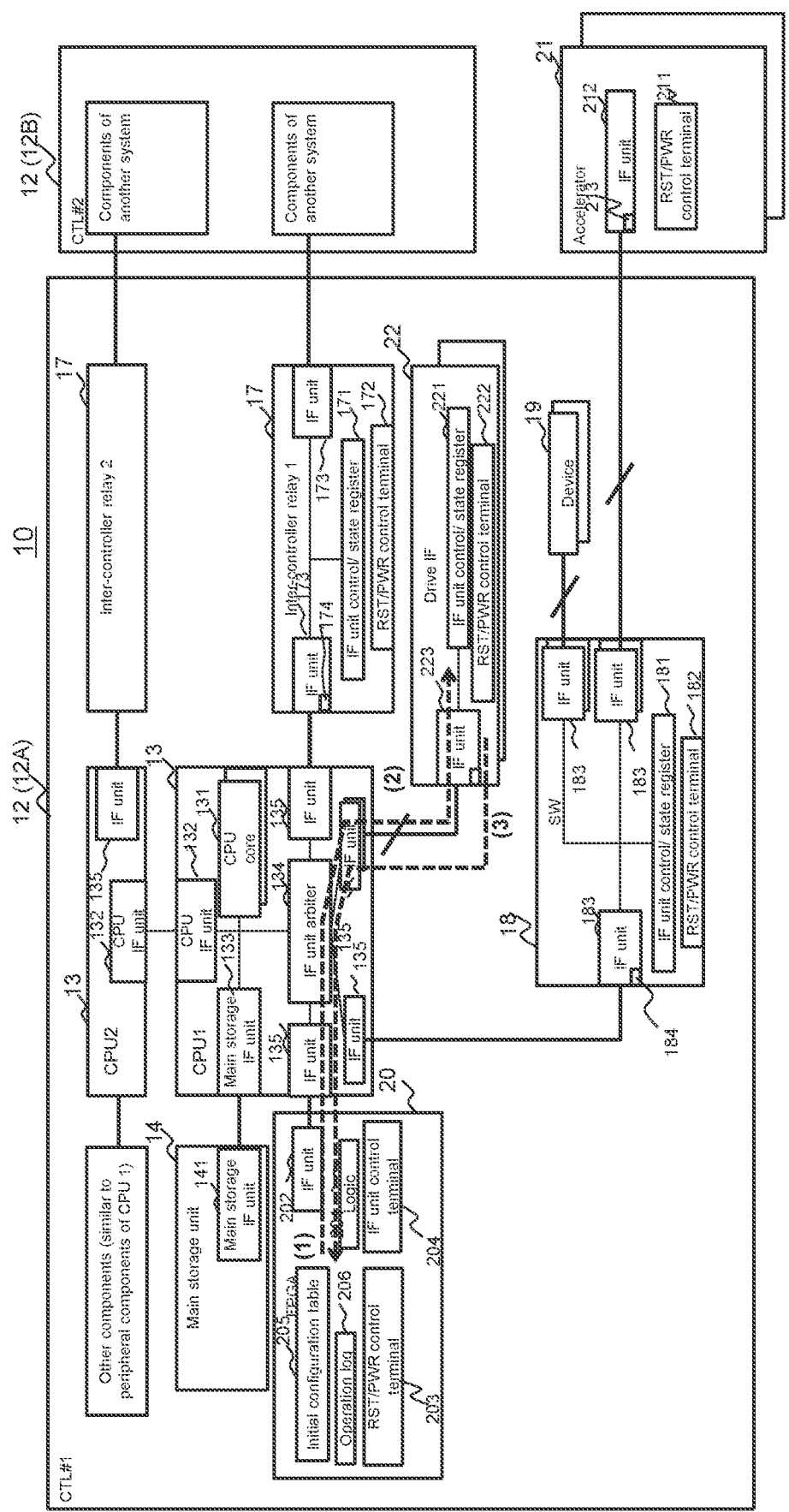
FIG. 4 is a diagram illustrating an overview of diagnostic processing of a bus and a device by the storage system according to the embodiment.

FIG. 4 is a diagram illustrating an overview of diagnostic processing of a bus and a device by the storage system according to the embodiment.

The diagnostic processing of a bus and a device is started by the FPGA 20 of the storage system 10.

The FPGA 20 transmits an access request (for example, a read request) to a device to be a diagnostic target (in this case, the drive IF 22) via a bus (a transmission path, a relaying switch, or the like) and IF units ((1) in FIG. 4).

As a result, when the IF unit 223 of the drive IF 22 normally receives the read request, the drive IF 22 reads a value of an address indicated by the read request in the IF unit control/state register 221 ((2) in FIG. 4). Next, the drive IF 22 returns the read value to the FPGA 20 via the IF unit 223 ((3) in FIG. 4).

According to the series of operations, diagnostics of operations can be respectively performed in a comprehensive and thorough manner with respect to the transmission path from the FPGA 20 to the CPU 13, internal circuits (the IF unit arbiter 134, the IF unit 135, and the like) in the CPU 13, the transmission path from the CPU 13 to the drive IF 22, and internal circuits of the drive IF 22.

When the FPGA 20 detects an occurrence of an abnormality (for example, when a response result from a device is not normal, when the FPGA 20 hangs, or when there is no response to an access request) in the series of operations, the FPGA 20 executes a reset of the IF section 223 of the drive IF 22 in the background (without involving the CPU core 131). The FPGA 20 is automatically restored and continues the diagnostic processing. Since the diagnostic processing of the FPGA 20 is executed by the logic 201, unlike processing involving sequentially executing processing of software such as the CPU core 131, even if the FPGA 20 hangs, the FPGA 20 can automatically restore itself.

Next, operations of failure detecting/coping processing in the storage system 10 will be described. The failure detecting/coping processing in the storage system 10 is constituted by a processing portion related to an abnormality based on a timeout (refer to FIG. 5) and a processing portion related to an abnormality identified by a diagnosis (refer to FIG. 6). In this case, an abnormality based on a timeout refers to an abnormality determined in a case where an access has been made but a response to the access has timed out, and an abnormality identified by a diagnosis is an abnormality in a case where there is a response to the access but content of the response is determined to be abnormal.

Figure 5:
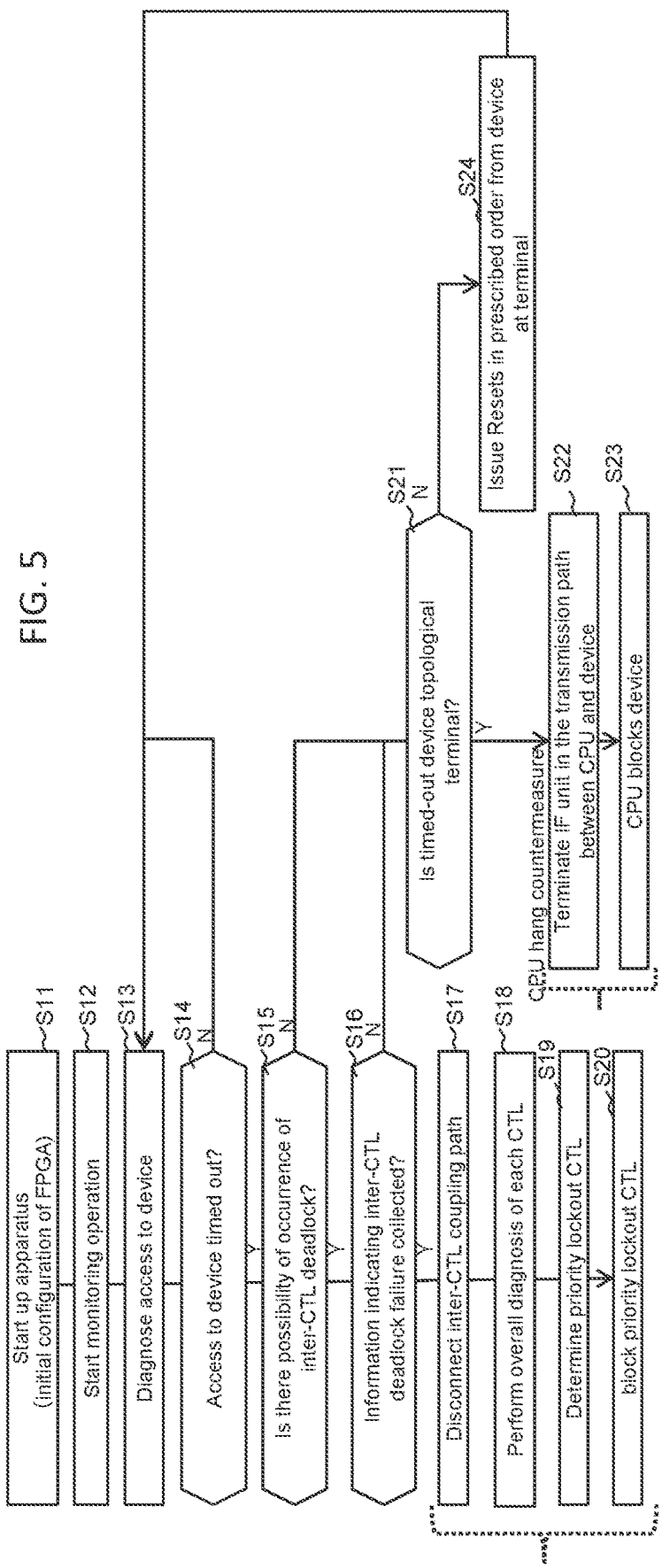
FIG. 5 is a flow chart of a processing portion related to an abnormality based on a timeout in failure detecting/coping processing according to the embodiment.

FIG. 5 is a flow chart of a processing portion related to an abnormality based on a timeout in the failure detecting/coping processing according to the embodiment.

When power of the storage system 10 is turned on, the CPU core 131 of the CPU 13 of the controller 12 performs initial configuration of the FPGA 20 (S11). Specifically, the CPU core 131 executes processing of configuring the initial configuration table 205 to the FPGA 20 or the like. The initial configuration table 205 may be configured on the basis of information necessary for configuring the initial configuration table 205 which is stored in an external storage unit or the like (not shown). The information necessary for the initial configuration table 205 has been configured in advance by a user of the storage system 10.

When initial configuration is performed, the FPGA 20 (more precisely, the logic 201) starts a monitoring operation for performing diagnostic processing with respect to a state of access to each device that is a diagnostic target (S12).

The FPGA 20 executes processing of step S13 and thereafter with respect to each device that is a diagnostic target. In this case, the diagnostic targets may be all devices and a bus between the devices, or a part of the devices and a bus between the devices.

First, the FPGA 20 diagnoses a state of access to the device or, in other words, diagnoses a state of the device that is the diagnostic target (a target device) and a state of the bus between the FPGA 20 and the target device (S13).

As a result, the FPGA 20 determines whether or not the diagnosis of an access to the device has timed out or, in other words, whether or not an abnormality of a timeout attributable to the bus between the FPGA 20 and the device or internal processing of the device has occurred (S14). As a result, when the access to the device has not timed out (S14: N), the FPGA 20 advances the processing to step S13, but when the access to the device has timed out (S14: Y), the FPGA 20 determines whether or not there is a possibility that a portion between the FPGA 20 and the timed-out device (the device itself or a bus) may cause an inter-controller (CTL) deadlock (S15).

As a result, when there is a possibility that an inter-controller deadlock may occur (S15: Y), the FPGA 20 attempts to acquire information indicating a failure of the inter-controller deadlock and determines whether or not information indicating an inter-controller deadlock failure has been acquired (S16). In this case, the information indicating an inter-controller deadlock failure may be, for example, information to the effect that the FPGA 20 is unable to get a response when actually accessing the main storage unit 14 of a controller 12 which differs from the controller 12 to which the FPGA 20 belongs (a controller of another system).

As a result, when information indicating an inter-controller deadlock failure has been acquired (S16: Y), the FPGA 20 outputs a signal for resetting the IF unit 173 of the inter-controller relay 17 that performs communication between controllers to disconnect the path coupling the controllers to each other (S17).

When the CPU core 131 of each controller 12 recognizes that the path coupling the controllers to each other has been disconnected, the CPU core 131 starts an overall diagnosis inside each controller 12 (S18), determines which controller 12 is to be blocked on a prioritized basis (S19), and any of the CPU cores 131 blocks the determined controller 12 (S20).

On the other hand, when there is no possibility that an inter-controller deadlock may occur (S15: N) or when information indicating an inter-controller deadlock failure could not be acquired (S16: N), the FPGA 20 determines whether or not the bus or the device which has timed out is a topological terminal or, in other words, a terminal device (S21). In this case, the device can be identified as a topological terminal due to an absence of an entry of which a device number corresponding to the device is stored in the higher-level device 205*i* in the initial configuration table 205.

As a result, when the timed-out bus or device is a topological terminal (S21: Y), the FPGA 20 resets the IF units coupled to the bus to the CPU 13 of the device in order to disconnect the transmission path between the device and the CPU 13 (S22). Subsequently, the CPU core 131 blocks the timed-out device (S23).

On the other hand, when the timed-out bus or device is not a topological terminal (S21: N), the FPGA 20 issues a signal for resetting IF units in a prescribed order from a terminal device on a terminal side of the device (S24) and advances the processing to step S13. The prescribed order in which signals for resetting IF units are issued may be an order starting from a device with a greatest topological depth, an order of registration to the initial configuration table 205, or an order determined by some kind of condition.

Figure 6:
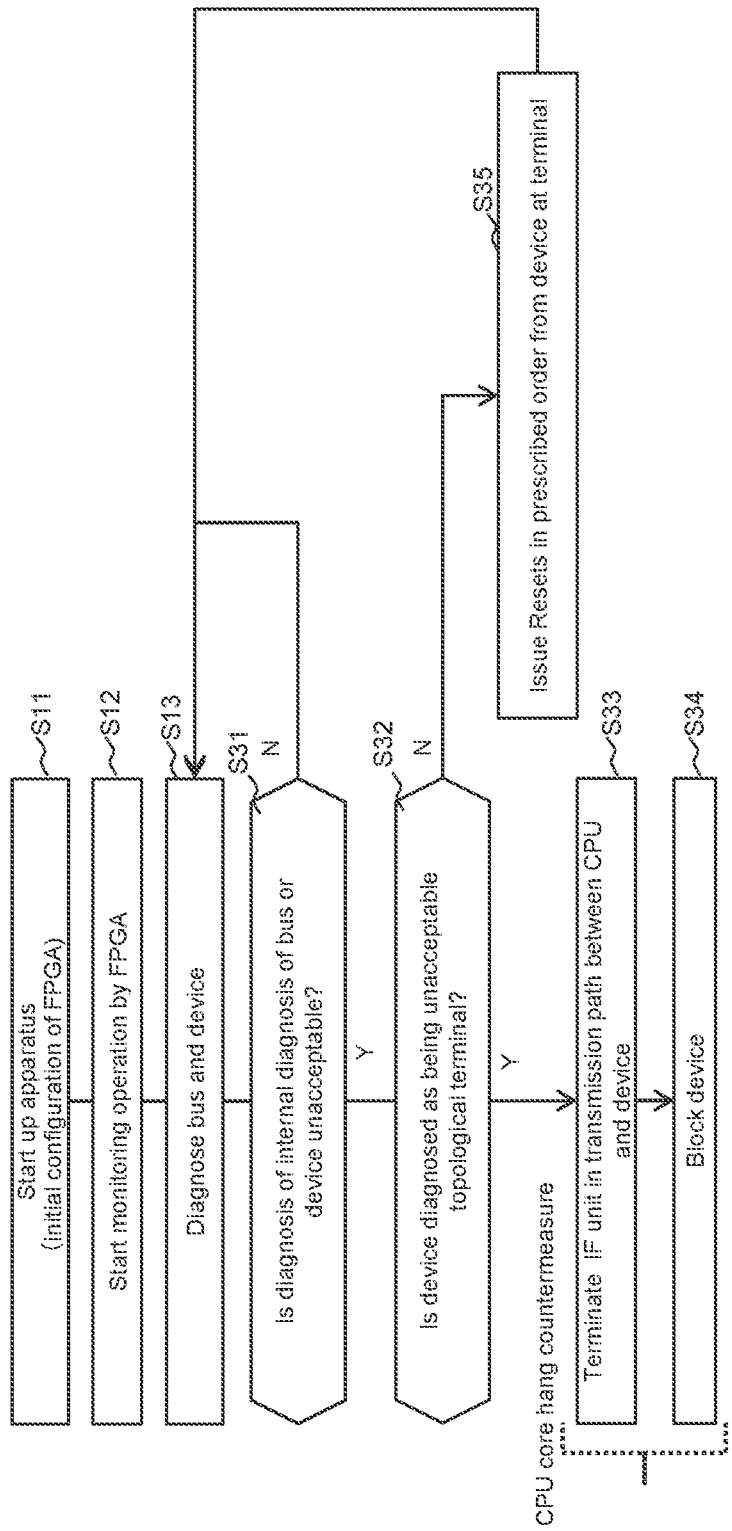
FIG. 6 is a flow chart of a processing portion related to an abnormality identified by a diagnosis in the failure detecting/coping processing according to the embodiment.

FIG. 6 is a flow chart of a processing portion related to an abnormality identified by a diagnosis in the failure detecting/coping processing according to the embodiment. It should be noted that portions in common with FIG. 5 will be denoted by the same reference characters.

As a result of the processing of step S13, the FPGA 20 determines whether or not a result of the diagnosis of the access to the device is unacceptable (abnormal) (S31). As a result, when the result of the diagnosis is not unacceptable (S31: N), the FPGA 20 advances the processing to step S13, but when the result of the diagnosis of the access between devices is unacceptable (S31: Y), the FPGA 20 determines whether or not the device diagnosed as being unacceptable is a topological terminal (S32).

As a result, when the device diagnosed as being unacceptable is a topological terminal (S32: Y), the FPGA 20 resets the IF units coupled to the bus to the CPU 13 of the device in order to disconnect the transmission path between the device and the CPU 13 (S33). Accordingly, the hang of the CPU core 131 can be resolved. Subsequently, the CPU core 131 blocks the device diagnosed as being unacceptable (S34).

On the other hand, when the device diagnosed as being unacceptable is not a topological terminal (S32: N), the FPGA 20 issues a signal for resetting IF units in a prescribed order from a terminal device on a terminal side of the device (S35) and advances the processing to step S13.

Next, a processing operation at a normal time in the storage system 10 will be described.

Figure 7:
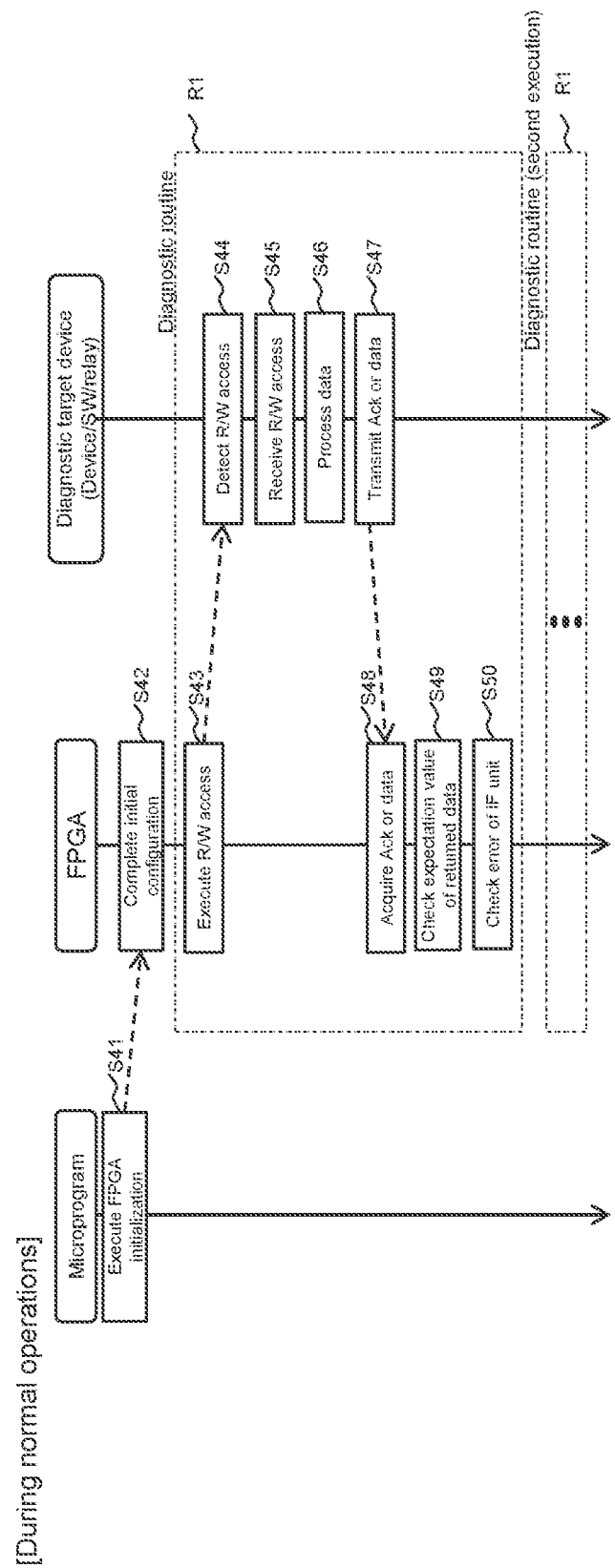
FIG. 7 is a sequence diagram of a processing operation at a normal time in the storage system according to the embodiment.

FIG. 7 is a sequence diagram of a processing operation at a normal time in the storage system according to the embodiment.

First, the CPU core 131 of the CPU 13 to execute the microprogram 13a executes processing of initializing the FPGA 20 (S41). Once initial configuration by the CPU core 131 is completed (S42), the FPGA 20 executes a diagnostic routine R1 with respect to a single device that is a diagnostic target (hereinafter, referred to as a target device) among a plurality of devices.

In the diagnostic routine R1, the FPGA 20 accesses the target device (by at least one of read and write) according to an access type (the type stored in the processing 205e of the initial configuration table 205) which is configured with respect to the target device (S43).

As a result, the target device detects an access request from the FPGA 20 (S44), receives the access request (S45), executes data processing corresponding to the access request (S46), and transmits a response corresponding to the access request or, in other words, transmits an Ack (an affirmative response) in the case of a write request and transmits data that is read target data in the case of a read request (S47).

The FPGA 20 acquires the Ack or data transmitted from the target device (S48), checks whether or not the returned data and an expectation value thereof match each other (S49), and checks whether or not there is an error of the processing of the IF unit of the target device (S50).

When an abnormality is not detected in the processing of steps S49 and S50, the FPGA 20 executes the diagnostic routine R1 with respect to a next target device.

Next, a processing operation upon an occurrence of an abnormality due to an internal failure of a device in the storage system 10 will be described.

Figure 8:
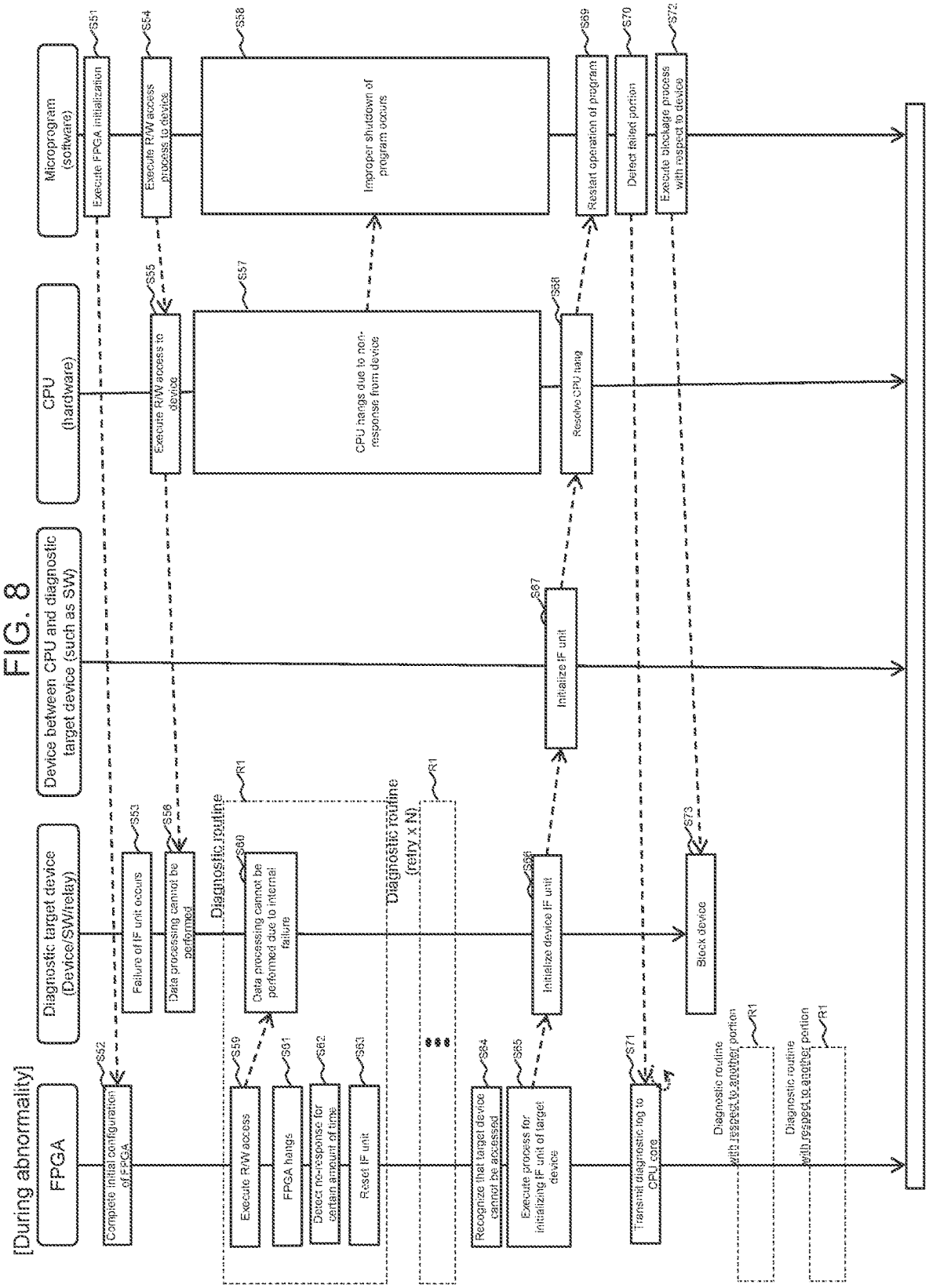
FIG. 8 is a sequence diagram of a processing operation upon an occurrence of an abnormality due to an internal failure of a device in the storage system according to the embodiment.

FIG. 8 is a sequence diagram of a processing operation upon the occurrence of an abnormality due to an internal failure of a device in the storage system according to the embodiment.

First, the CPU core 131 of the CPU 13 to execute the microprogram 13a executes a process of initializing the FPGA 20 (S51). The initial configuration for the FPGA 20 is performed by the CPU core 131 and the FPGA 20 is thus completed (S52).

Let us assume that, at this point, a failure of an IF unit has occurred in a device that is a diagnostic target (hereinafter, referred to as a target device: an example of a first device) (S53).

When the CPU core 131 of the CPU 13 to execute the microprogram 13a executes access processing to the target device (S54), an access is to be made from the CPU 13 to the target device (S55). However, in doing so, since a failure has occurred in the IF unit of the target device, the target device is unable to perform data processing based on the access (S56).

As a result, in the CPU 13 (the CPU core 131), a hang occurs due to a non-response from the target device (S57), and an improper shutdown of the microprogram 13a is to occur (S58).

Once initial configuration by the CPU core 131 is completed (S52), the FPGA 20 executes the diagnostic routine R1 with respect to the target device.

In the diagnostic routine R1, the FPGA 20 accesses the target device according to an access type configured with respect to the target device (S59). Since a failure has occurred in the IF unit of the target device, the target device is unable to perform data processing based on the access (S60).

Accordingly, the FPGA 20 hangs (S61), the target device is detected to be non-responsive for a certain amount of time (S62), and the IF unit 202 is reset (S63). When the IF unit 202 is reset in this manner, the FPGA 20 becomes capable of communicating with each device. Since the processing of S62 and S63 are executed by the logic 201, processing are to be executed without trouble even when the FPGA 20 hangs.

Next, when the access to the target device is not successful, the FPGA 20 repetitively executes the diagnostic routine R1 by the number of retries associated with the target device (the value of the number of retries 205k of a corresponding entry in the initial configuration table 205).

When the access does not succeed even though the diagnostic routine R1 is repeated by the number of retries associated with the target device, the FPGA 20 recognizes an abnormality in which the target device cannot be accessed (S64), and executes processing for initializing the IF unit of the target device (S65). Specifically, the FPGA 20 transmits a device OFF signal for instructing power of the target device to be turned off or a device reset signal for instructing the target device to be reset to the RST/PWR control terminal of the target device or transmits, to the IF unit control terminal of the target device or the IF unit of the target device, an IF reset signal for instructing the IF unit to be reset.

As a result, the IF unit is initialized in the target device (S66). Next, since the IF unit of the target device is initialized, IF unit are also initialized in devices which are coupled to the target device and which are present between the target device and the CPU 13 (S67). It should be noted that an operation of initializing the IF unit of a device coupled to the target device is realized by a processing operation in accordance with a protocol on the bus.

As a result, the hang is resolved in the CPU 13 (S68), and the CPU core 131 of the CPU 13 becomes capable of restarting execution of the microprogram 13a (S69). Next, the CPU core 131 detects a target device that has become a failed portion (S70). As processing of detecting the target device that has become a failed portion, for example, the CPU core 131 may request to the FPGA 20 to acquire the operation log 206 and detect the target device from the operation log 206. When the FPGA 20 receives a request for the operation log 206 from the CPU core 131, the FPGA 20 transmits the operation log 206 to the CPU core 131 (S71). While the FPGA 20 is configured to transmit the operation log 206 in accordance with a request from the CPU core 131 in this example, alternatively, the FPGA 20 may be configured to transmit the operation log 206 to the CPU core 131 even when there is no request from the CPU core 131.

Next, the CPU core 131 executes block processing with respect to the detected target device (S72). As a result, the target device is blocked (S73). Accordingly, the CPU core 131 becomes capable of continuously executing processing that do not use the target device. Subsequently, the FPGA 20 sequentially performs the diagnostic routine R1 with respect to other devices (examples of the second device) among the devices that are monitoring targets.

Next, a processing operation upon an occurrence of an abnormality due to an inter-controller deadlock in the storage system 10 will be described.

Figure 9:
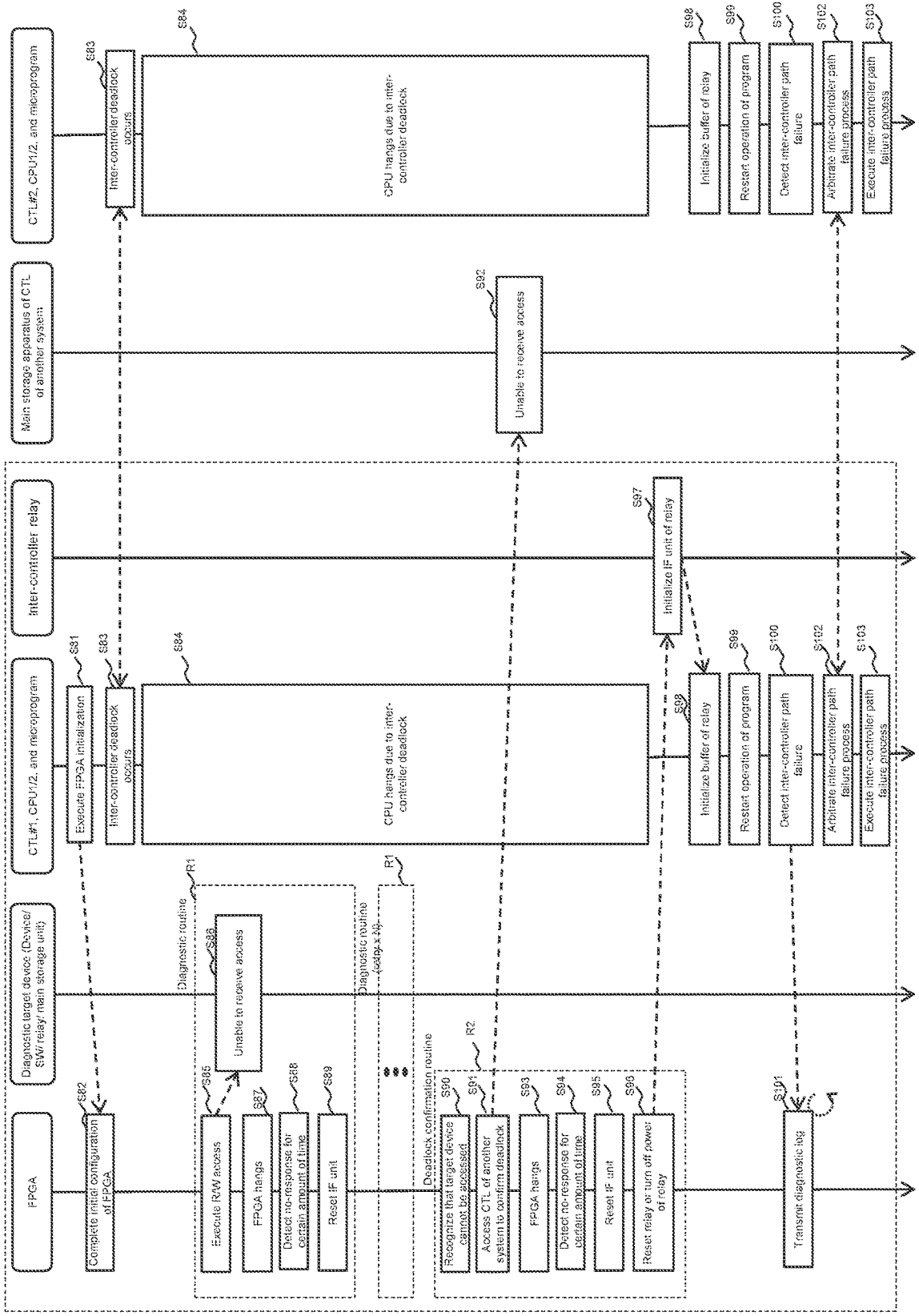
FIG. 9 is a sequence diagram of a processing operation upon an occurrence of an abnormality due to a deadlock in the storage system according to the embodiment.

FIG. 9 is a sequence diagram of a processing operation upon the occurrence of an abnormality due to a deadlock in the storage system according to the embodiment.

First, the CPU core 131 of the CPU 13 to execute the microprogram 13a executes processing of initializing the FPGA 20 (S81). The initial configuration for the FPGA 20 is performed by the CPU core 131 and the FPGA 20 is thus completed (S82).

Let us assume that, at this point, an inter-controller deadlock has occurred between the controller 12A and the controller 12B (S83). As a result, at the controller 12A and the controller 12B where the inter-controller deadlock has occurred, a CPU hang occurs due to the inter-controller deadlock (S84).

Once initial configuration by the CPU core 131 is completed (S82), the FPGA 20 executes the diagnostic routine R1 with respect to a target device.

In the diagnostic routine R1, the FPGA 20 accesses the target device according to an access type configured with respect to the target device (S83).

In this case, the target device is a target device that can possibly cause an inter-controller deadlock, and the present example will be described on the assumption that the target device cannot be accessed due to an inter-controller deadlock.

Therefore, the target device is unable to receive an access request from the FPGA 20 (S86). Accordingly, a hang occurs in the FPGA 20 (S87), the target device is detected to be non-responsive for a certain amount of time (S88), and the IF unit 202 is reset (S89). When the IF unit 202 is reset in this manner, the FPGA 20 becomes capable of communicating with each device.

Next, when the access to the target device does not succeed, the FPGA 20 repetitively executes the diagnostic routine R1 by the number of retries associated with the target device (the value of the number of retries 205k of a corresponding entry in the initial configuration table 205).

When the access does not succeed even though the diagnostic routine R1 is repeated by the number of retries associated with the target device, the FPGA 20 executes a deadlock confirmation routine R2. Specifically, the FPGA 20 recognizes an abnormality in which the target device cannot be accessed (S90), and in order to acquire information for confirming a deadlock, the FPGA 20 attempts to access the main storage apparatus 14 of the controller 12 of another system (S91). In the present example, since an inter-controller deadlock has occurred, the controller 12 of the other system cannot receive an access request by the FPGA 20 (S92).

Accordingly, a hang occurs in the FPGA 20 (S93). The FPGA 20 detects that the target device is non-responsive for a certain amount of time (S94), and resets the IF unit 202 (S95). Next, the FPGA 20 transmits a signal for resetting the inter-controller relay 17 or turning off power of the inter-controller relay 17 to the inter-controller relay (S96). In the inter-controller relay 17, the IF unit 173 is to be initialized (S97).

Accordingly, the CPU core 131 initializes a buffer of the inter-controller relay 17 (S98), operations of the microprogram are enabled (S99), and various programs by the CPU core 131 are to be restarted.

Next, the CPU core 131 detects a path failure among controllers by acquiring the operation log 206 of the FPGA 20, acquiring an apparatus status of the storage system 10, or the like (S100). When the FPGA 20 receives a request for the operation log 206 from the CPU core 131, the FPGA 20 transmits the operation log 206 to the CPU core 131 (S101). Next, the CPU core 131 arbitrates inter-controller path failure processing with the CPU core 131 of the controller 12 of the other system (S102), and executes the inter-controller path failure processing in accordance with the arbitration (S103). The inter-controller path failure processing may involve, for example, blocking one of the controllers 12.

It is to be understood that the present invention is not limited to the embodiment described above and that various modifications can be made in the invention without departing from the spirit and scope thereof.

For example, while the embodiment described above represents an example in which, when a device has an RST/PWR control terminal and an IF unit control terminal, the FPGA 20 and both terminals are coupled by signal lines, at least only one of the terminals may be coupled to the FPGA 20 by a signal line, and when a device has only one of an RST/PWR control terminal and an IF unit control terminal, the FPGA 20 may be coupled to the terminal by a signal line. When resetting an IF unit of a device, the FPGA 20 may transmit a corresponding signal to the coupled terminal.

In addition, while the embodiment described above represents an example in which each controller 12 is provided with the FPGA 20, the present invention is not limited thereto and, for example, the FPGA 20 may only be provided in one of the controllers 12 and the one FPGA 20 may execute failure detecting/coping processing with respect to a plurality of devices coupled to both controllers 12.

Furthermore, while the FPGA 20 is provided inside the controller 12 in the embodiment described above, alternatively, the FPGA 20 may be provided outside of the controller 12.

What is claimed is:
1. A computer system, comprising:
 a first controller having a first central processing unit (CPU), a first main storage unit and a first relay having a first interface unit;
 a second controller having a second CPU, a second main storage unit and a second relay which is coupled to the first relay of the first controller via a communication path;
 a processing unit of the first controller having a hardware logic configured to execute prescribed processing; and a plurality of devices of the first controller coupled to the processing unit via a bus, wherein the hardware logic of the processing unit is configured to:

attempt to access each of the plurality of devices, upon determining access to a device, among the plurality of devices, has timed out, determine whether the device or the bus cause a deadlock in the first controller, attempt to access the second main storage unit of the second controller and upon determining access to the second main storage unit is unresponsive, and output a signal to reset the first interface unit of the first relay to disconnect the communication path coupling the first controller to the second controller, and wherein the first CPU and the second CPU are each configured to detect whether the communication path has been disconnected and upon determining the communication path has been disconnected, at least the second CPU blocks the first controller.

2. The computer system according to claim 1, wherein the processing unit includes a processing unit-side interface unit configured to perform communication processing via the bus of the processing unit, wherein the hardware logic is configured to:

attempt to access the device via the processing unit-side interface unit, and when the hardware logic detects an abnormal shutdown of the access to the device, reset the processing unit-side interface unit.

3. The computer system according to claim 2, wherein the hardware logic is configured to;

attempt to access a first device among the plurality of devices via the processing unit-side interface unit, and when the access to the first device abnormally shuts down, reset the processing unit-side interface unit, and subsequently attempt to access a second device that differs from the first device among the plurality of devices via the processing unit-side interface unit.

4. The computer system according to claim 1, wherein the first CPU is coupled to the bus, and wherein the hardware logic is configured to:

notify, upon determining there is an abnormality in an access to the device, the first CPU information indicating a device causing the abnormality.

5. The computer system according to claim 1, wherein the device includes at least one of a device reset terminal for inputting a device reset signal for resetting the device and an interface reset terminal for inputting an interface reset signal for resetting the device-side interface unit in the device, wherein the hardware logic is configured to:

upon determining there is an abnormality in an access to the device, transmit the device reset signal to the device reset terminal of the device or transmit the interface reset signal to the interface reset terminal of the device, to reset the device-side interface unit in the device.

6. A device management method by a computer system including a first controller having a first central processing unit (CPU), a first main storage unit and a first relay having a first interface unit; a second controller having a second CPU, a second main storage unit and a second relay which is coupled to the first relay of the first controller via a communication path; a processing unit of the first controller having a hardware logic that executes prescribed processing; and a plurality of devices of the first controller coupled to the processing unit via a bus, the device management method comprising:

attempting, by the hardware logic of the processing unit, to access each of the plurality of devices;

upon determining access to a device, among the plurality of devices, has timed out, determine whether the device or the bus cause a deadlock in the first controller, attempt to access the second main storage unit of the second controller and upon determining access to the second main storage unit is unresponsive, and output a signal to reset the first interface unit of the first relay to disconnect the communication path coupling the first controller to the second controller, wherein the first CPU and the second CPU are each configured to detect whether the communication path has been disconnected and upon determining the communication path has been disconnected, at least the second CPU blocks the first controller.

\* \* \* \* \*